United States Patent [19]

Horstmann

[11] Patent Number: 5,995,099
[45] Date of Patent: Nov. 30, 1999

[54] METHOD FOR CREATING AND MAINTAINING PAGE LINKS

[76] Inventor: Jens U. Horstmann, 3633 Vireo Ave., Santa Clara, Calif. 95051

[21] Appl. No.: 08/662,746

[22] Filed: Jun. 10, 1996

[51] Int. Cl.[6] ...................................................... G06F 15/00
[52] U.S. Cl. ............................................................. 345/335
[58] Field of Search .................................... 345/333, 334, 345/335, 339, 340, 347; 707/500, 501, 513, 514

[56] References Cited

U.S. PATENT DOCUMENTS

| 5,204,947 | 4/1993 | Bernstein et al. | 395/157 |
|---|---|---|---|
| 5,297,249 | 3/1994 | Bernstein et al. | 395/156 |
| 5,408,655 | 4/1995 | Oren et al. | 395/600 |
| 5,675,752 | 10/1997 | Scott et al. | 395/333 |
| 5,675,753 | 10/1997 | Hansen et al. | 395/333 |

OTHER PUBLICATIONS

Fielding, R., "Maintaining Distributed Hyperext Infostructures: Welcome to MOMspider's Web", Department of Information and Computer Science, University of California, Irvine, Jun. 17, 1994, 11 pages.
Fielding, R., "MOMspider — Avoiding and Leafing Specific URLs", University of California, Irvine, Aug. 10, 1994, 2 pages.
Fielding, R., "MOMspider—Configuration Options", University of California, Irvine, Aug. 9, 1994, 1 page.
Fielding, R., "Extending MOMspider's Functionality", University of California, Irvine, Aug. 10, 1994, 1 page.
Fielding, R., "MOMspider Instruction Files", University of California, Irvine, Aug. 10, 1994, 4 pages.
Fielding, R., "MOMspider — Making Document Metainformation Visible", University of California, Irvine, Aug. 10, 1994, 2 pages.
Fielding, R., "MOMspider Installation Information", University of California, Irvine, Aug. 10, 1994, 3 pages.
Glossbrenner, A. and Glossbrenner, E., *the little Web Book*, (Hester, Nolan ed., Peachpit Press 1996), "What is the World Wide Web Anyhow?", pp. 9–15.
Glossbrenner, A. and Glossbrenner, E., *the little Web Book*, (Hester, Nolan ed., Peachpit Press 1996), "The Web Browser Cookbook", pp. 211–212.
Niederst, J., with Freedman, E., *Designing for the Webb: Getting Started in a New Medium*, (Mui, L. ed., O'Reilly & Associates, Inc. 1996) (Apr. 1996: First Edition), "How the Web Works", pp. 3–12.
Niederst, J., with Freedman, E., *Designing for the Webb: Getting Started in a New Medium*, (Mui, L. ed., O'Reilly & Associates, Inc. 1996) (Apr. 1996: First Edition), "Creating Hypertext Links", pp. 41–46.
"Persistent URL Home Page", The PURL Team, purl@oclc.org, last modified Saturday, Apr. 6 00:57:21 Est 1996, 30 pages.
"Searchable Resources Lists with Documentation", Computing and Information Services, Electronic Information Group, Texas A&M University, Jun. 10, 1996, 13 pages.

*Primary Examiner*—Phu K. Nguyen
*Attorney, Agent, or Firm*—Arthur J. Behiel

[57] ABSTRACT

A method establishes page links between pages on the Internet. Individual sites (collections of pages) include dedicated links pages that consolidate links to other sites. The links page associated with a given site (the first site) includes an "add link" button that, when selected, allows an owner of a second site to add a link to the links page. The new link can be used to establish a link from the links page to the second site. To ensure reciprocity, the method also includes prompting the owner of the second site for a link back to a page of the first site and later checking the second site for the link back.

30 Claims, 8 Drawing Sheets

METHOD FOR CREATING AND MAINTAINING PAGE LINKS

BACKGROUND INFORMATION

The World-Wide Web (the Web) is composed of a vast number of uniquely addressed "pages" of information available on the Internet. The unique addresses, conventionally known as Universal Resource Locators (URLs), make it easy to establish links between related pages. Information on a given page may be linked to related information on a second page by providing a "link" specifying the URL of the second page. Such links are typically represented as highlighted text or graphic representations that may be selected using a mouse-type pointer (a "mouse"). Users move between pages on the Internet by selecting links according to the user's interest.

Suppose for instance that a user is viewing a page maintained by a bookstore and happened upon a discussion of bicycling, and further suppose that the discussion includes a link to another page containing further information on bicycling. Such a link could be identified by the term "bicycling" being highlighted within the text of the bookstore page. The user could then select the "bicycling" link to view the page of information pointed to by the "bicycling" link. This bicycling page may include, for example, a list of bike shops. Similarly, the user could select a link on the "list of bike shops" page and move to another related page, such as a page related to a specific bike shop. This method of moving from page to page on the Internet in search of information is commonly referred to as "surfing the Net."

In the foregoing example, an owner of a bike shop might view the bookstore's "list of bike shops" page and desire to have a link included on that page pointing to a page maintained by the owner's bike shop. Customers could then be referred to the bike shop from the bookstore's pages. Conventionally, the owner of the bike shop contacts the bookstore, for example, via electronic-mail (e-mail), telephone, or mail, and requests that a link to the bike shop be included in the bookstore's "list of bike shops" page. An individual at the bookstore might then manually edit the "list of bike shops" page to add a link to the bike shop.

In return for providing a link to the bike shop, the bookstore would likely require a link from the bike shop back to the bookstore so that users accessing bike-shop pages would be referred to the bookstore (for example, to search for books on bicycling). To accomplish such a return link, the bookstore would typically communicate with the bike shop to specify an address of a page of the bookstore to which the bike store should provide a link.

Unfortunately, it is possible that either the bookstore and/or the bike shop will neglect to establish the agreed upon links. Further, the tasks of communicating between the bike shop and bookstore and manually adding links are time consuming. A more equitable and less time consuming method of establishing reciprocal links between pages is therefore desired.

SUMMARY

A method establishes reciprocal page links between pages on the Internet. According to the method, individual sites (collections of pages) include dedicated links pages that contain lists of links, primarily to other sites. The links page associated with a given site (the first site) includes an "add link" button that, when selected, allows an owner of a second site to add a link to the links page of the first site. The new link can be used to establish a link from the links page to the second site. To ensure reciprocity, the method also includes prompting the owner of the second site for a link back to a page of the first site and later checking the second cite for the back link.

This summary does not purport to define the invention. The invention is defined by the claims.

DETAILED DESCRIPTION

Figure 1:
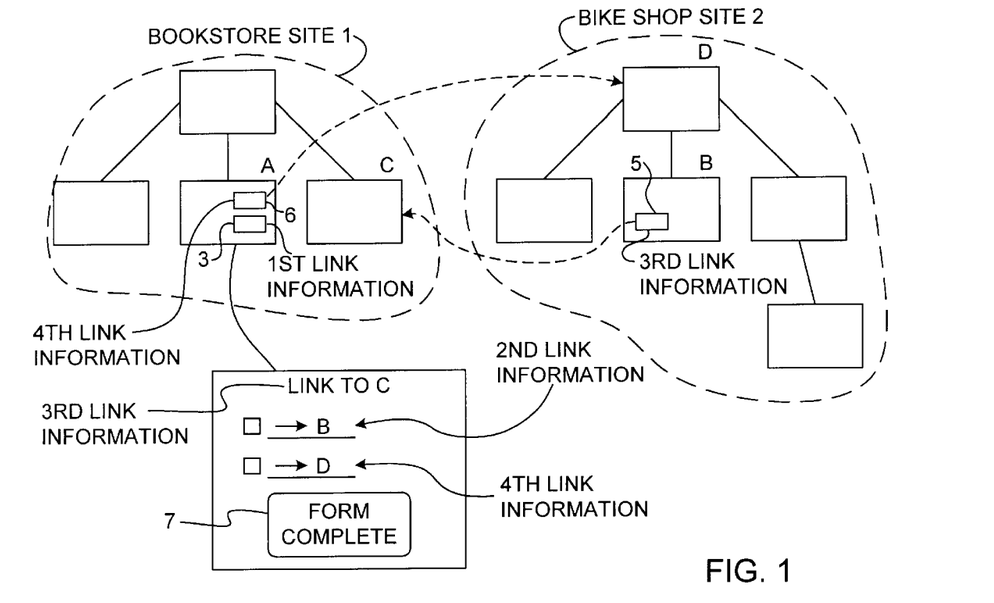
FIG. 1 is a graphical representation illustrating an embodiment in accordance with the present invention.
Figure 2:
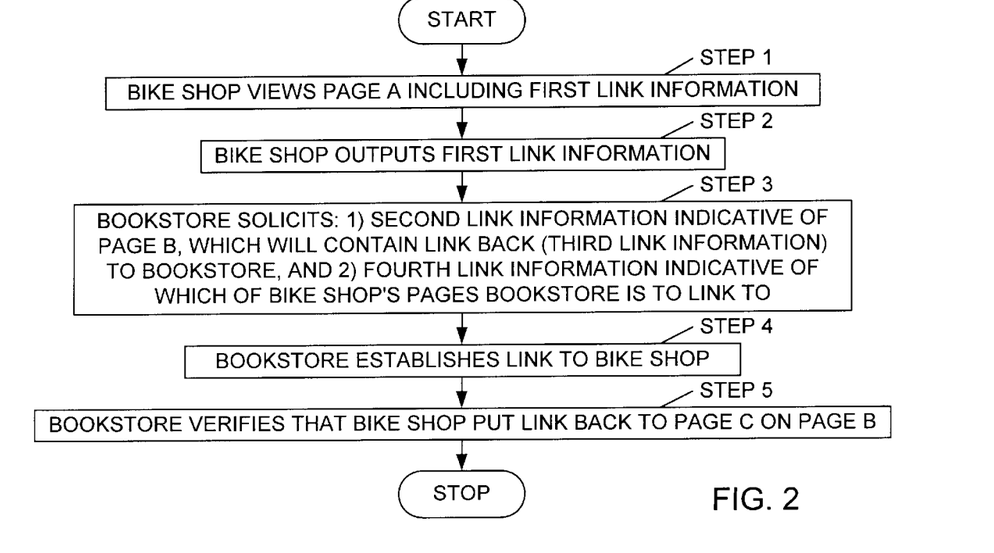
FIG. 2 is a flow chart illustrating the embodiment of FIG. 1.

FIG. 1 is a graphical representation and FIG. 2 is a flow chart illustrating an embodiment in accordance with the present invention. A first site 1 (for example, a site maintained by a bookstore) has multiple pages and a second site 2 (for example, a site maintained by a bike shop) has multiple pages. Assume for this example that the bookstore's pages are maintained on a server of the bookstore and that the bike shop's pages are maintained on a server of the bike shop. One or more pages of bookstore site 1 contain a link (an "add link" link) for adding a link to a page designated by a user accessing bookstore site 1. In the example of FIG. 1, page A includes a graphically represented "add link" link 3.

For illustrative purposes, the term "site" refers to one or a collection of related pages, typically maintained by a single entity, or owner, that maintains authority over the content of the site. For example, the bookstore's interconnected and related pages together form bookstore site 1, while the bike shop's interconnected and related pages together form bike-shop site 2. In the present example, the bookstore pages exist on one server and bike shop pages exist on another; however, this is not required. The physical location of the various pages, forms, and software are not important so long as the pages are linked. For example, the bookstore and bike shop pages could exist on a single server, or each of the pages could exist on separate servers.

A simple example provided with reference to FIG. 2 illustrates some of the benefits of the embodiment of FIG. 1. Assume that the bike-shop owner is viewing the bookstore's page A (step 1). If the bike-shop owner wishes to add a link from the bookstore's page A to bike-shop site 2, then the bike-shop owner could select the "add link" link 3 on page A (step 2). Such selection is accomplished by activating link 3 using e.g. a mouse.

The first link information associated with link 3 accesses a "form" 4 (step 3) that is then displayed to the bike-shop owner. Form 4 is supported by links software. Form 4 includes third link information indicating where in the bookstore's pages (in this example page C) a link back 5 from the bike shop is to point. Form 4 also solicits from the bike shop: 1) second link information indicative of a page (in this example page B) that will contain link back 5 (third link information), and 2) fourth link information indicative of which of the bike shop's pages (in this example, page D) the bike shop wishes the bookstore to provide a link to. Forms, such as form 4, are a conventional type of electronic document used to elicit responses from users through graphical interfaces that may include text, fill-in blanks, buttons, and check boxes. For a detailed discussion of the use of forms, see John December and Mark Ginsburg, *HTML & CGI Unleashed* (1995), which is incorporated herein by reference.

Once the bike-shop owner fills out form 4, the bike-shop owner selects a "form complete" button 7, which initiates a transfer of the form data to the server supporting form 4 (hereafter the "links server"). The links server includes software that presents and processes forms, and could be the same server that maintains the bookstore's pages or some other server. Software on the links server (step 4) automatically modifies page A to include a link 6 (the fourth link information) from page A to page D as requested by the bike-shop owner. The new page A, including the link to page D, is then redisplayed to the bike-shop owner. Thus, page A is modified and redisplayed without any intervention from the bookstore owner.

After a period of time (typically a few days), verification software, typically located on the links server, verifies (step 5) that the bike-shop owner reciprocated by providing a link back 5 to page C as requested on form 4. Because the bike-shop owner indicated on form 4 that the back link would be provided on page B, the verification software searches page B for link back 5 (the third link information) to page C. If link back 5 does not exist, then the verification software removes link 6 (fourth link information) from the bookstore's page A to the bike shop's page D. Alternatively, the software may issue a reminder to the bike shop (via e-mail, for example) to add link back 5 to the bookstore. Once link back 5 (third link information) is verified to exist on the bike shop's page B, the method terminates. In this way, the inventive method provides for the creation of reciprocal page links.

Figure 3:
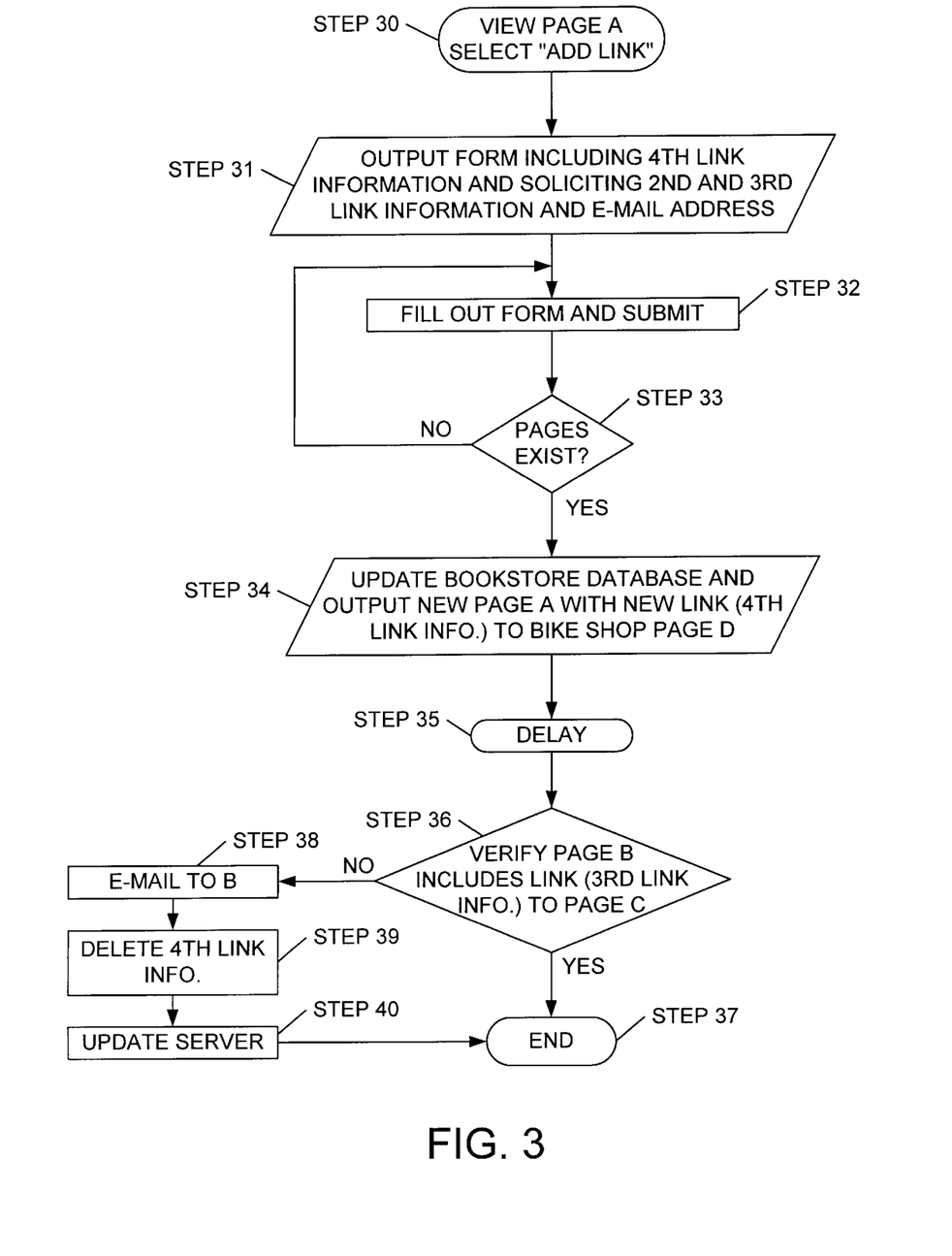
FIG. 3 is a flow chart illustrating another embodiment.

FIG. 3 is a flow chart illustrating another embodiment. The method begins in step 30 when an Internet user (in the example a bike-shop owner) selects add-link button 3 to add a link from bookstore site 1 to bike-shop site 2. By selecting add-link button 3, the bike-shop owner retrieves form 4 (Step 31), which includes fourth link information specifying where bike shop 2 should link back to, and which solicits information specifying:

1) second link information indicative of a page (in this example page B) that will contain the link back 5 (third link information),
2) fourth link information indicative of which of the bike shop's pages (in this example, page D) the bike shop wishes the bookstore to provide a link to, and
3) the bike-shop owner's e-mail address.

In Step 32, the bike-shop owner fills out form 4 and submits form 4 by selecting form-complete button 5. Next (step 33), the links software exercises the links specified by the bike-shop owner in form 4 to ensure that the specified links correspond to existing pages. The links software accomplishes this by, for example, transmitting the second link information and awaiting a response. If there is no page associated with the second link information, an error message will be supplied in response to the second link information. The third link information is similarly verified. If either of the second and third link information retrieves an error message (i.e., if one or both pages corresponding to the second and third link information do not exist), then the bike-shop owner is notified of the error and presented once again with form 4.

Once the bike-shop owner specifies second and third link information corresponding to existing pages, the method moves to step 34, in which the server containing page A is updated so that page A includes a link to page D, as specified by the fourth link information entered in form 4.

After a delay of e.g. two days (step 35), the links software automatically moves to step 36 in which the links software verifies that the bike-shop owner has provided a link back from page B to page C of bookstore site 1 (as specified in form 4 as third link information). If page B includes link back 5, then the transaction is complete (step 37). However, should the bike-shop owner fail to fulfill the obligation to provide link back 5, the links software will notify the bike-shop owner via e-mail of the absence of a return link (step 38), delete link 6 from page A (step 39), and update the server containing page A to include the modified page A (step 40). The transaction is then complete (step 37).

Links Page Creation Method

Figure 4:
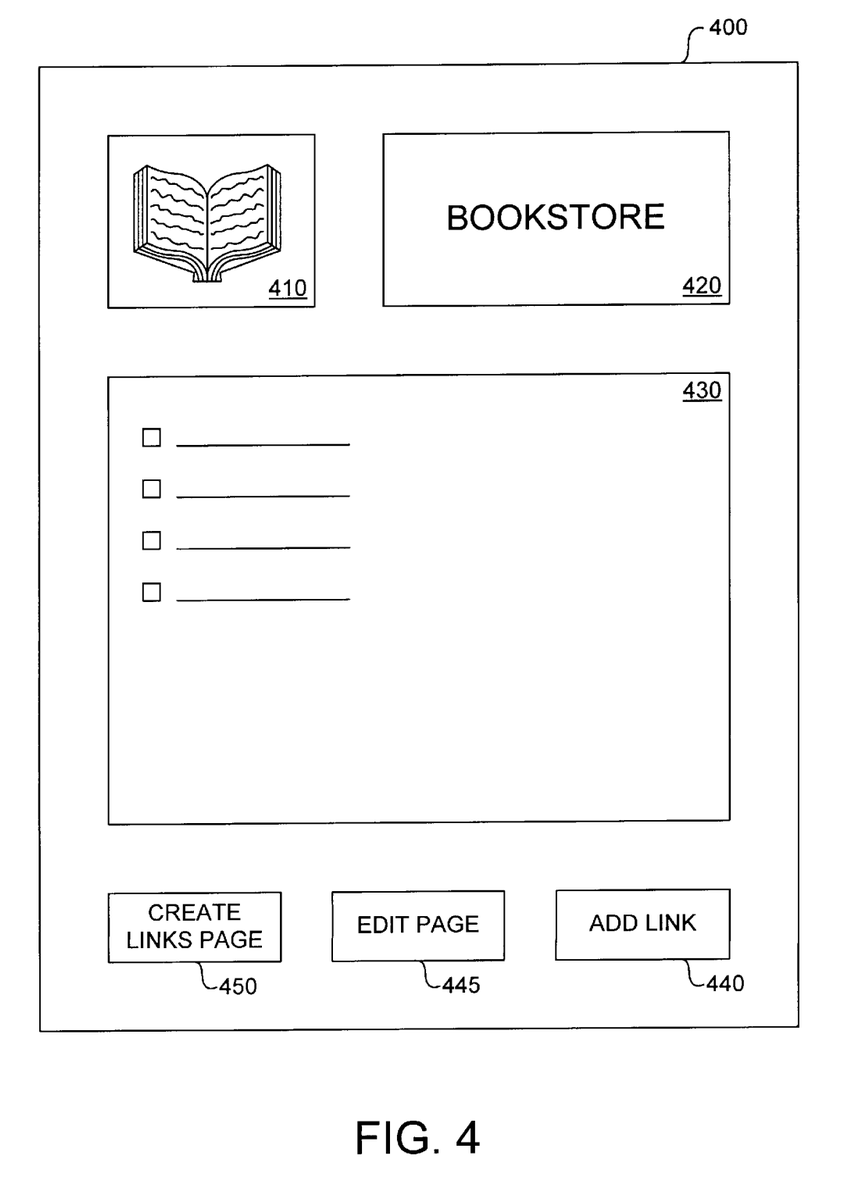
FIG. 4 illustrates a dedicated links page 400.

FIG. 4 illustrates a dedicated links page 400. Conventional links pages differ from other pages in that the message content of a links page is primarily presented as one or more lists of highlighted links. Such a links page is added to a particular site to consolidate links from that site. For example, in the embodiment of FIG. 1, page A could be a dedicated links page including links to other sites in addition to bike shop site 2.

Links page 400 includes a graphic field 410, a title field 420, a links field 430, an add-link button 440, and an edit button 445. Graphic field 410, title field 420, and links field 430 are conventional page elements in HTML documents. The function of add-link button 440 is described above in connection with add-link button 3 of FIG. 1, and edit button 445 is discussed below in connection with FIG. 6. In addition to the foregoing elements, links page 400 includes a create-links-page button 450, which allows users to create their own dedicated links page similar to links page 400.

Figure 5:
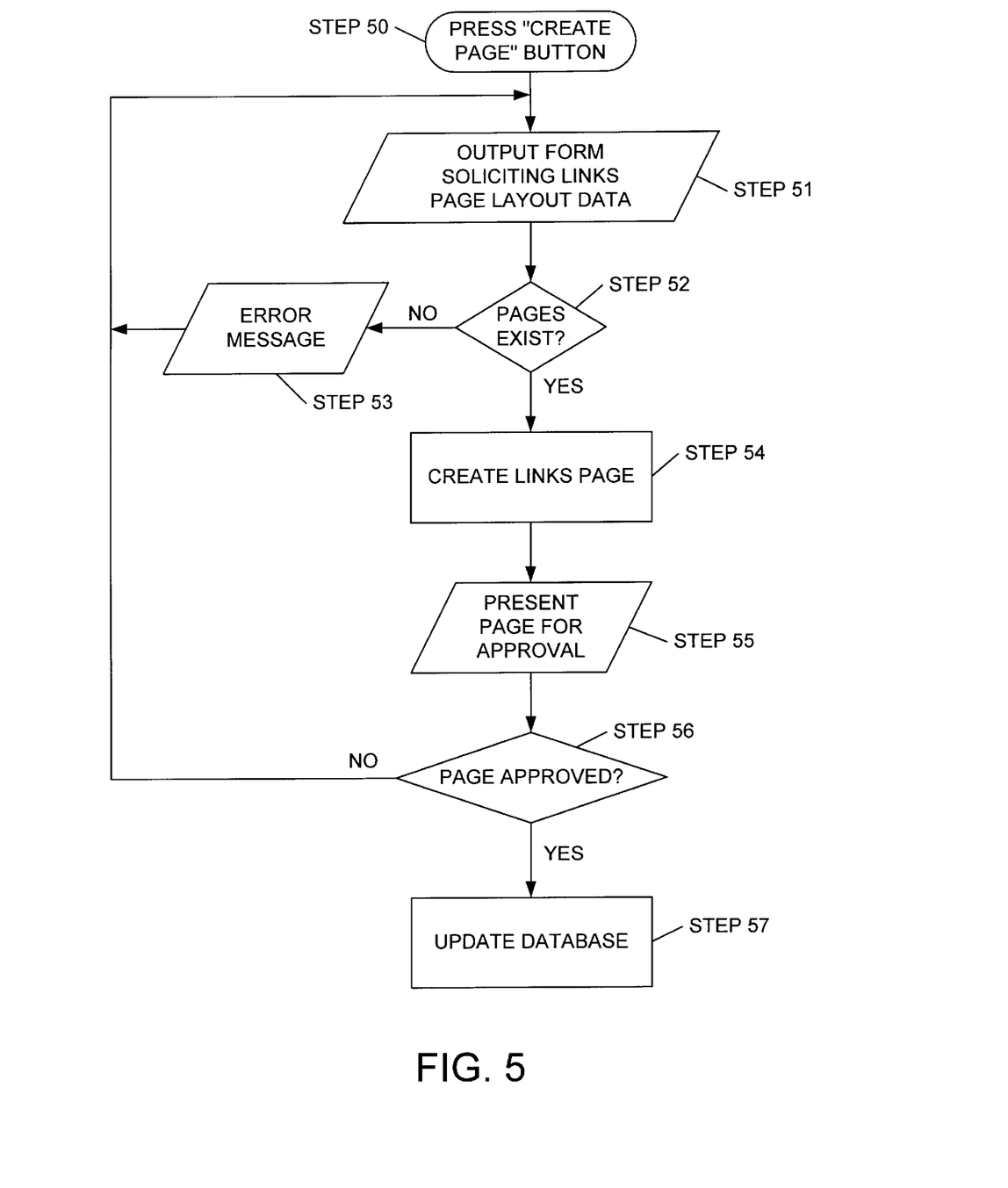
FIG. 5 is a flow diagram illustrating a method used to create a links page similar to links page 400.

FIG. 5 is a flow diagram illustrating a method used to create a links page similar to links page 400. For illustrative purposes, bookstore site 1 and bike-shop site 2 are used to describe the method of creating a links page.

Suppose that the bike-shop owner is impressed with the "add-link" feature of page A and would like to have bike-shop site 2 support such a feature. The bike-shop owner could begin the method of creating such a links page for bike-shop site 2 by pressing create-links-page button 450 at the bottom of links page 400. Link information associated with create-links-page button 450 accesses a form that is then displayed to the bike-shop owner. This form solicits information pertinent to the creation of a links page specific to bike-shop site 2. For example, the form could solicit link information corresponding to an HTML file (a page) that specifies an appropriate layout for a page associated with bike-shop site 2. This will allow the new links page to provide the same look and feel as the other bike shop pages. For example, the bike-shop owner could specify a page that includes the bike shop's logo and title to fill in graphic field 410 and title field 420. Alternately, the bike-shop owner could select a default links page by simply specifying the page title (e.g., "Owner's bike shop"), in which case a generic links page is provided. The create-links-page form also prompts the bike-shop owner to provide the owner's e-mail address, one or more links to other pages, and a password that will allow the bike-shop owner to later edit the new links page. The form could also solicit the maximum number of links that may be added to the new links page.

Once the create-links-page form is filled out, the bike-shop owner selects, for example, a "form complete button" on the form to initiate a transfer of the form data to the links server. The links software on the links server then checks each specified link to determine whether they correspond with valid page addresses. If the links do not correspond with valid page addresses, an error message (step 53) is provided to the bookstore owner and the method returns to step 51, in which the form information is once again solicited. If the solicited links address existing pages, then the method moves to step 54, in which the links software assembles the new links page (step 54) and presents the new links page to the bike-shop owner for approval (step 55). The bike-shop owner can then approve the page by, for example, selecting a "page approved" button (step 56), in which case the software will update the server to include the new page (step 57). Alternately, in step 56 the bike-shop owner could elect not to approve the new links page, in which case the method would return to step 51 in which a form solicits links-page layout data.

Once the bike-shop owner is satisfied with the links page and the links page is stored in the links server, viewers of bike-shop site 2 are able to access the bike-shop links page to find links to other resources, such as pages, forms, audio information, or video information. In addition, the new links page will support the add-links feature and the create-page feature so that future users will be able to both add themselves to the links page of bike-shop site 2 and to create a links page for themselves.

Links Page Edit Method

Using the methods described above in connection with FIGS. 1–3, an Internet user who has access to a links page can add a link to that links page. However, only the "owner" of a links page has the power to otherwise edit the links page. For example, with respect to links page 400, the bookstore owner can delete links, change the look of the page, or add one-way links that will not be deleted in the event that a link back is not established. Such one-way links may be desirable for example when a relatively small site wishes to provide a link to a large site that will not provide return links. In addition, the owner of a links page may select a "read-only" mode for that links page, in which case the add-link button 440 is either absent or prompts a message explaining that new links will not be added. In one embodiment, the read-only mode is selected by specifying, during the creation or editing of links page 400, that the number of allowable additional links is zero. This read-only option enables an owner of a links page to control the number and/or destination of links on the links page.

Figure 6:
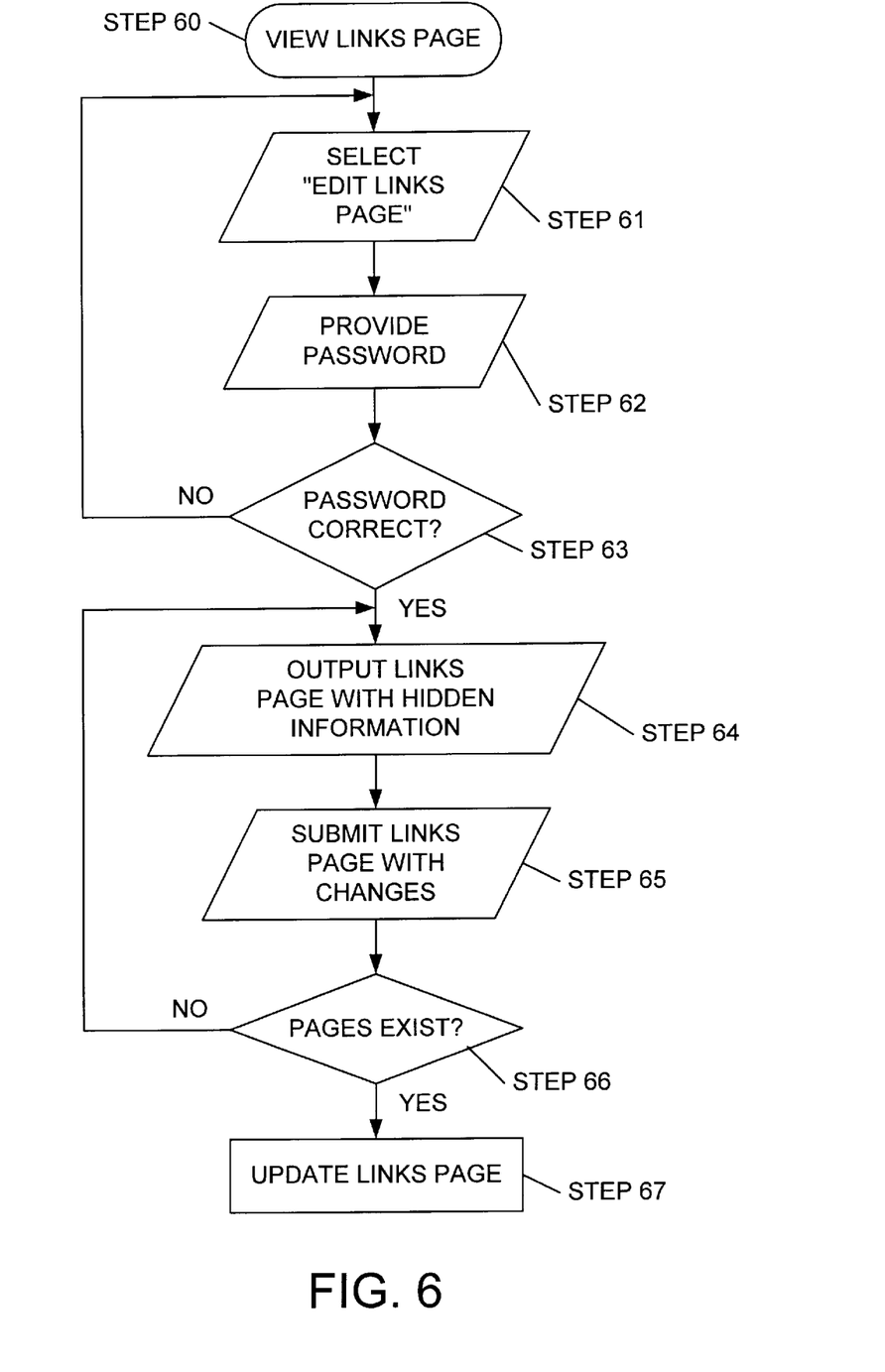
FIG. 6 is a flow chart illustrating a method of editing an existing links page.

FIG. 6 is a flow chart illustrating a method of editing an existing links page. Beginning at step 60, a user who has access to the password corresponding to a links page views that links page. In the following example, the user having access to the password will be the bookstore owner, and the links page to be edited is links page 400 of FIG. 4. To begin the edit method, the bookstore owner selects edit button 445, which causes the links server to prompt the bookstore owner to enter the designated password (step 62). If the password is incorrect, the links software returns to step 61; if the password is correct, the method moves to step 64, in which the links page is output to the owner. In step 64, the links page may include functions or information that are not available without the password. For example, in one embodiment the links page displays statistics relating to the number of times the links page was visited during a particular time period.

In step 64, the owner is able to edit the links page, typically by adding additional links or deleting undesirable links. The owner may also wish to reformat the links page by adding topic sections and dividing various links under appropriate headings. Once the links page is edited to the owner's satisfaction, the owner may select an "edit complete" button (not shown), thereby sending the updated links-page information back to the links server (step 65).

Next (step 66), the links software exercises any newly added links specified by the owner to ensure that the specified links correspond to existing pages. If one or more of the new pages do not exist, the method returns to step 64, in which the owner can re-edit the links page. In one embodiment, the links software indicates which of the edit links do not have corresponding pages. Finally, if the links software determines that each link corresponds with an existing page, then the links software updates the links page (step 67) to be the amended links page 400.

Automatic Links-Page Maintenance

Links associated with Internet resources often fail because Internet resources move, change names, or change method of access. Such invalid links are commonly referred to as "stale" links. A user following a stale link from one page to another will encounter an error message and will not get the information that the user intended to access. Moreover, large numbers of stale links can virtually cut off portions of the Web from outside resources. The problem of stale links is addressed using an automatic background check that automatically and periodically verifies links, and deletes those links that do not correspond to existing pages or that belong to sites that do not provide an appropriate link back.

Figure 7:
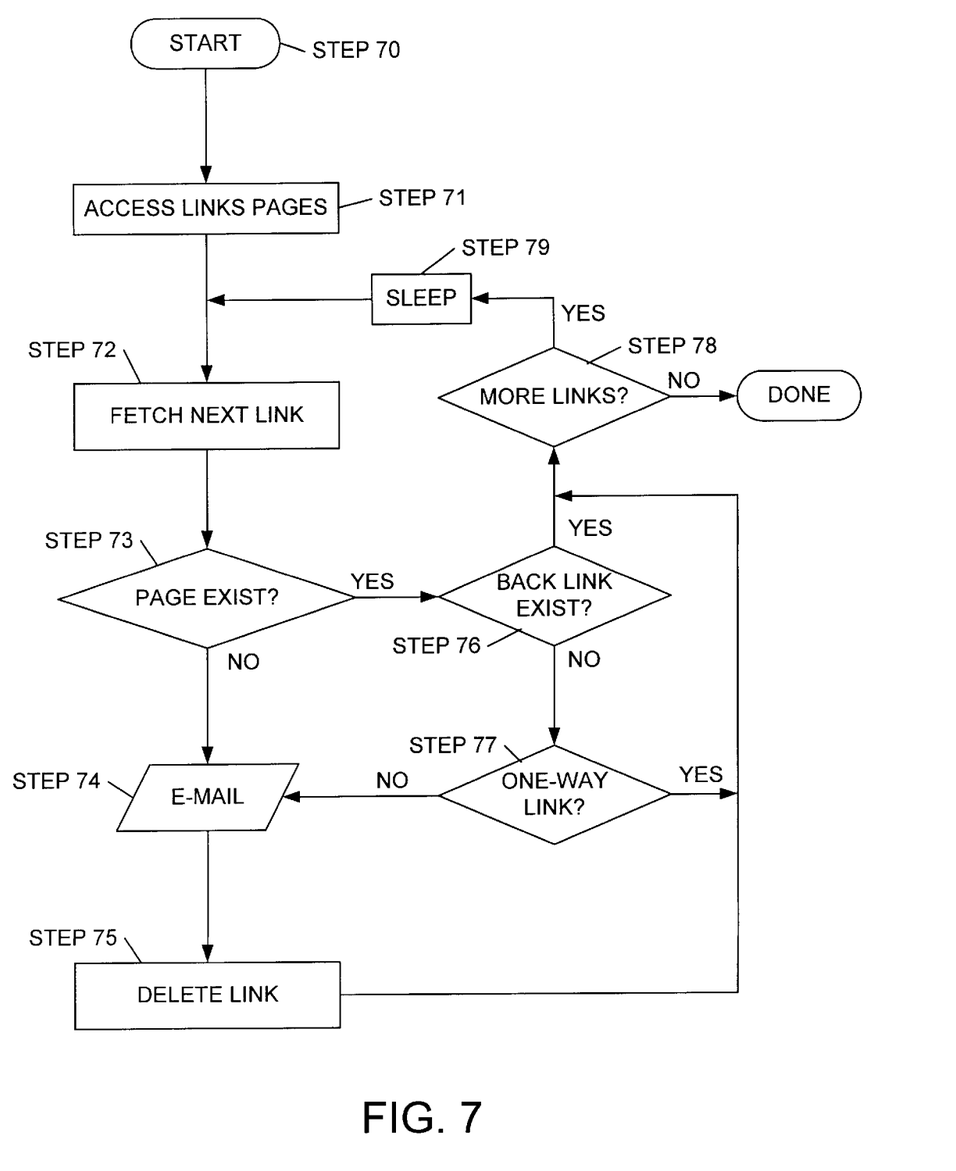
FIG. 7 is a flow chart that describes a method of automatically checking links.

FIG. 7 is a flow chart that describes a method of automatically checking links. The method begins at step 70, and may be initiated by a user or software that has edit access to the links page or pages to be checked. In the case of a user initiating the method, the user must have access to the password for the page or pages being checked.

In embodiments wherein a number of links pages are stored on a single server, the links software associated with that server may be configured to periodically perform the method of FIG. 7 for example every Sunday night at midnight. Once the method is started, the links software accesses the server that includes the links pages to be checked. (This server may include a single links page or any number of links pages belonging to one or more sites.) To begin the method, the links software fetches the first link of the first page to be checked (step 72). Then, in step 73, the links software exercises the link to insure that the link addresses an existing page. If the page does not exist, the method moves to step 74, in which the links software sends an e-mail message to the owner of the entity to which the link was directed. The e-mail message identifies the defective link and notifies the owner that the link is being deleted. The link is deleted in step 75.

If, on the other hand, a page is found to exist (step 73) for the link being inspected, then the links software verifies the existence of a back link associated with the link being inspected (step 76). If no back link exists, the method moves to step 77, in which the links software determines whether the link under inspection is a one-way link. As discussed above, an owner of a links page may specify certain one-way links where desired. In such a case, the user would not want to delete the link for lack of a back link. Thus, if the link is determined to be a one-way link, then the links software leaves the link in place and checks to see whether other links are available for inspection (step 78). If, on the other hand, the link is not a one-way link, then the flow moves to steps 74 and 75, in which e-mail is sent and the link deleted as discussed above.

From step 76, if a back link is found to exist, the links software moves to step 78 to determine whether additional links are available for inspection. If there are additional links available for inspection, the links software moves to step 79 and remains idle ("sleeps") for a second or two before continuing to step 72. The step of allowing the links software to sleep is advantageous where, for example, the links being inspected address pages on the Internet: the delay keeps the method of FIG. 7 from crowding the Internet while checking what may be thousands of links. If, on the other hand, the links software determines (step 78) that no more links are available for inspection, then the inspection method is complete.

The link inspection method of FIG. 7 is not limited to inspecting links on links pages. Other links may be inspected as well. However, because such links are not associated with links pages, it may be desirable to simply notify (e.g., send e-mail to) the owner of the entity to which the link was directed when the link is broken without eliminating the link. It may also be desirable to check return links in a similar manner for links not associated with any links page.

In accordance with another embodiment, the links software employs a least-recently-used method to limit the number of links specified on a given links page. For example, the bookstore owner may desire to limit the number of links specified in links field 430 (see FIG. 4) so that the number of links specified does not exceed the maximum number that can be displayed on a single links page. In such a case, if a user attempts to add a link to a full links page, the new link can be substituted for the least-recently-used link specified in links field 430. Alternatively, the least-often-used method may be used, in which case the least-often-used link would be deleted. In yet another embodiment, the links software is configured to eliminate links that have not been selected for a predetermined time period.

Link Forwarding

Intermediate resources are available to forward calls to a new location (e.g., to a new URL), in the event that a resource changes addresses. Such intermediate resources are commonly known as Persistent Uniform Resource Locators (PURL). Some embodiments in accordance with the invention use PURLs to maintain robust links between Internet resources.

PURLs provide a service analogous to call-forwarding features available from telephone companies. Using call forwarding, a telephone subscriber can receive calls directed to a given number, despite a change in the subscriber's location, so long as the subscriber makes the new location known to the forwarding resource. Similarly, when a resource on the Internet changes locations (e.g. moves to a different server), the resource owner need only update the PURL with the change in address to maintain the integrity of all of the links to the resource. For more information on PURLs, see *Persistent URL Home Page,* purl@oclc.org, the subject matter of which is incorporated herein by reference.

Representative Physical Implementations

Figure 8A:
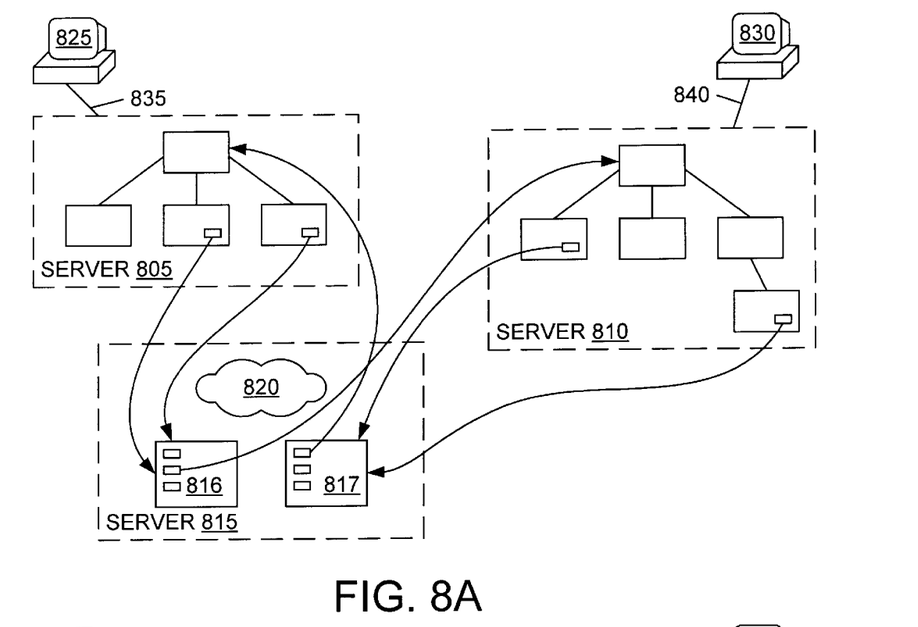
FIGS. 8A through 8C are schematic diagrams of representative physical implementations in accordance with the present invention.

FIG. 8A is a block diagram of a first server 805 a second server 810, and a third server 815. Servers 805, 810, and 815 may be components of the Internet, which is a collection of wires, switches, and software that makes it possible for computers all over the world to communicate. However, the present invention is not limited to the Internet in particular, nor to interconnected servers in general; instead, the present invention is useful in many network environments implemented on one or many servers.

In the embodiment of FIG. 8A, a collection of bookstore pages is located on server 805, and a collection of bike-shop pages is located on server 810. Dedicated links pages 816 and 817, associated with bookstore site 1 and bike-shop site 2, respectively, are located with links software 820 on server 815. Thus, bookstore site 1 and bike shop site 2 are each located on more than one server; book shop site 1 is located on servers 805 and 815, and bike-shop site 2 is located on servers 810 and 815. Personal computers 825 and 830, operated by the bookstore and bike shop, respectively, conventionally provide access via modems and lines 835 and 840 to interconnected servers 805, 810, and 815.

Figure 8B:
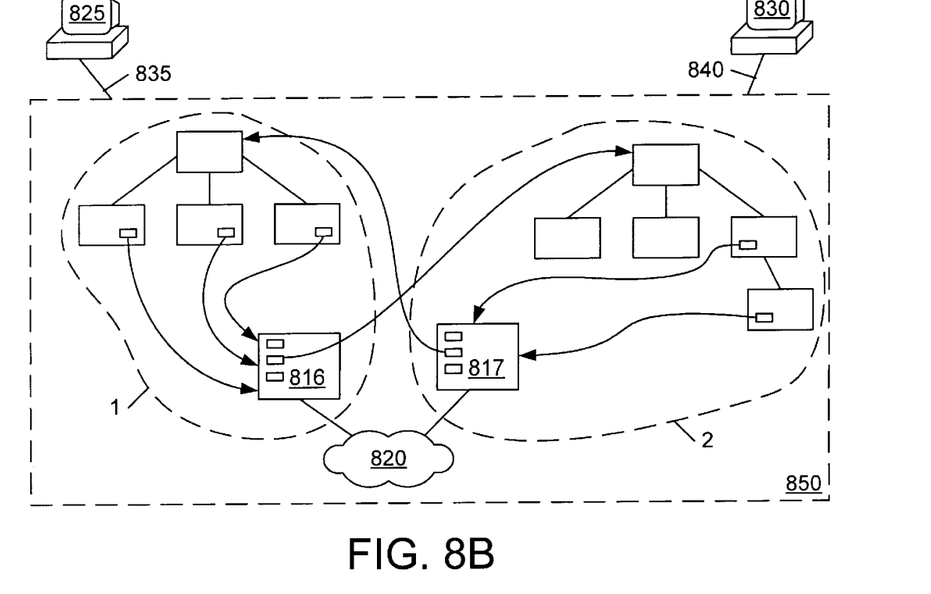
Figure 8C:
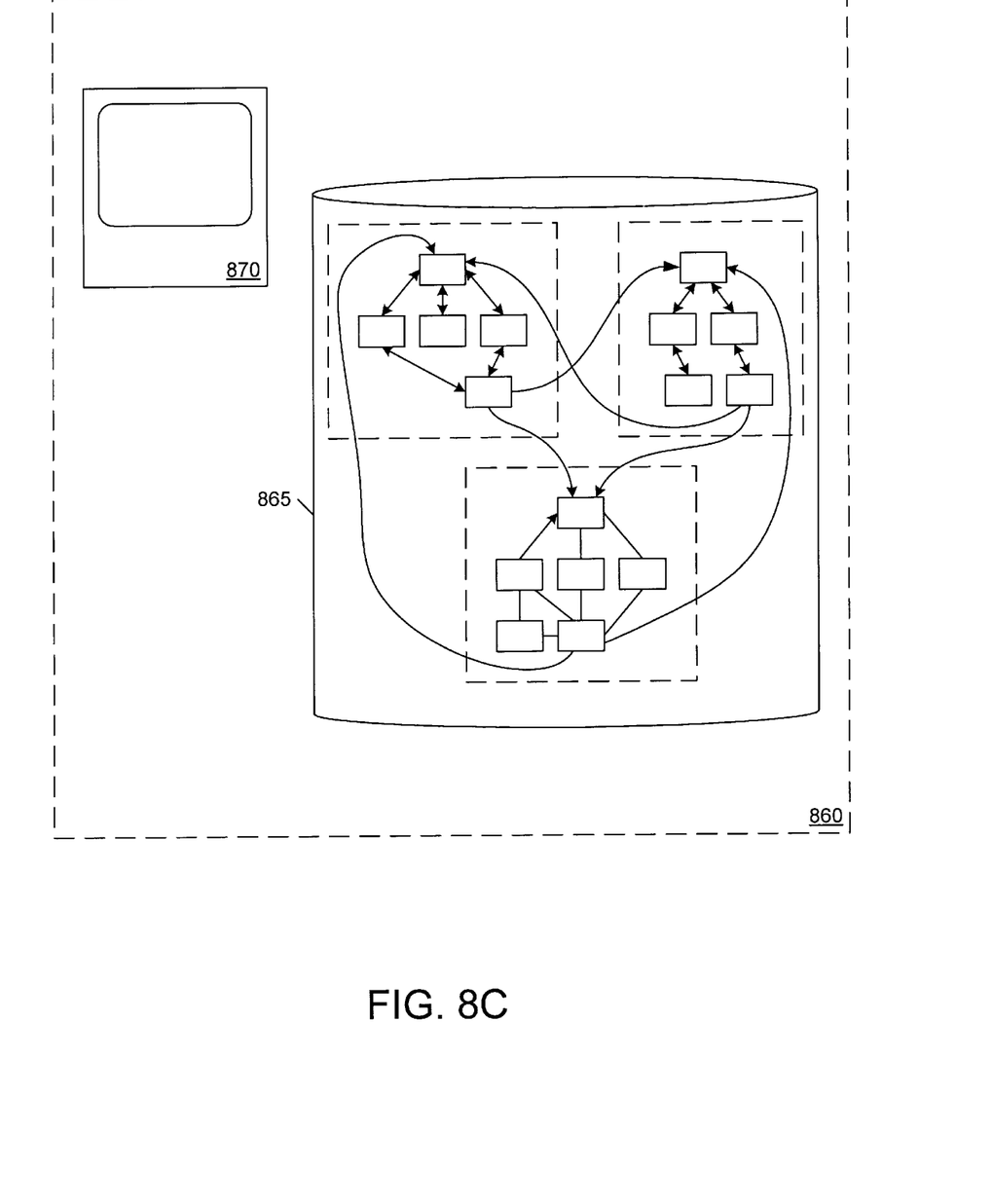

As shown in FIG. 8A, one or more pages associated with a given site may be linked to a given links page (e.g., the related pages on server 805 are linked to links page 816). Each links pages may then provide links to various topics of interest. Alternately, the various sites, links pages, and links software may be located on a single server 850 (FIG. 8B) or on any number of interconnected servers. Furthermore, as shown in FIG. 8C, a server 860 having memory 865 in which the various sites, links pages, and links software may be located, may also include a monitor 870 for displaying links pages.

The appendix is a software listing of a program for creating and maintaining page links. The software, written in the C++ programming language, may be run on a Sparc 10 workstation, available from Sun Microsystems of Mountain View, Calif. The software of the appendix interfaces with web server software that executes on the workstation. The web server software is available from the National Center for Supercomputer Applications (NCSA). The server software, in turn, interfaces with browser software, such as the Netscape browser available from Netscape Communications Corporation of Mountain View, Calif.

The present invention is not limited to the above-described specific embodiments. For example, each of the embodiments described above can be implemented using a programming language capable of distributing executable content to individual users over the Internet. One such programming language, Java, is available from Sun Microsystems, Inc., of Mountain View, Calif. Using such a language, software supporting each function of the linking software described above could be sent along with pages and forms along with the executable software required to display, method, and update those pages and forms. Transferring executable software to the user is beneficial because it minimizes interaction between the user and the server. Further, while the present invention has been described with respect to the Internet, the invention is equally applicable to other data structures, such as linked page data structures on other internet servers, or even on a single server. In addition, while the sites of the foregoing embodiments are described as including a single links page, more than one links page may be provided for a given web site. Accordingly, various adaptations, modifications and substitutions of various of the features of the specific embodiments described above can be practiced without departing from the scope of the invention as defined by the claims.

APPENDIX

```
// cli.c
//    program to maintain and manage HTML links page
//    (C) Copyright J. Horstmann
#include <stdio.h>
#include <string.h>
#define   MAXL 256
#define EOL    '\0'
int main(int argc, char** argv, char** envp)
{
    // setup options and arguments
    Args args(argc, argv);
    //     load CGI arguments and variables from web
           server
    CGI cgi;
    // setup CLI specific things
    CLI   cli(args, cgi);
    // now execute and do what has to be done
    cli.execute();
    return(cli.status);
}
    CLI::cli(Args& args, CGI& cgi) : _args (args),
_cgi(cgi)
{
    // setup a few things here . . .
    mode = getMode();
}
void CLI::execute()
{
    // figure out what mode we operate in
    switch (mode)
    {
        case CreateA:
        //     create new cli page - (a) output form to
               solicit info
               outputCreateForm();
               break;
        case CreateB:
        //     create new cli page - (b) received form
               check links and
        // info and create links page
               if (newPage())
                   createPage();
               else
                   _cgi.error("page exists");
               break
        case CreateC:
        //     create new cli page - (c) page approved,
               update database
               is (pageAccepted())
                   createEntity();
               else
                   outputCreateForm();
               break;
        case EditA:
        // edit Links page - check user/password
            if (!authenticate())
                _cgi.error("wrong password");
            lock();
            outputEditPage();
            break;
        case EditB:
        // edit Links page - process edit information
            if (editFeedback())
            {
                update();
                unlock();
            }
            else
            {
                outputEditPage();
            }
            break;
        case AddLinkA:
        //     add link to Links page - solicit
               necessary info
               outputAddForm();
               break;
        case AddLinkB:
        //     add link to Links page - check info and
```

APPENDIX-continued

```
               update database
            if (addFeedback())
            {
                //    the link back, etc. can be checked
                      here or in
                //    this simple implementation during
                      the routine
                // maintenance run
                update();
            }
            else
                outputAddForm();
            break;
        case Maintenance:
        // maintenance run - check links on page
            for (int i = 0; linkPages[i]; i++)
            {
                validateLinks (linkPages[i]);
                sleep(10);
            }
            break;
        default:
            // invalid mode
            _cgi.error("invalid mode");
            break;
    }
    //    looks like we are done - return appropriate
          error code if
    //    necessary - else confirm that everything
          worked just fine
    report();
}
void CLI::report()
{
    // flush CGI messages out
    _cgi.flush();
}
```

What is claimed is:

1. A method of establishing a bidirectional link between a first site and a second site, wherein the first site is controlled by a first entity that maintains authority over the first site and that lacks authority over the second site, the method comprising:

(a) outputting a page A of the first-site to a second entity that maintains authority over the second site and that lacks authority over the first site, wherein page A prompts the second entity to output first link information to initiate the bidirectional link between the first and second sites;

(b) receiving the first link information from the second entity;

(c) soliciting second link information from the second entity, the second link information indicative of a page B of the second site that will include third link information but that does not include the third link information; and (d) after (c), verifying that page B includes the third link information.

2. The method of claim 1, further comprising:

(e) after (b) and before (d), outputting the third link information.

3. The method of claim 1, wherein the soliciting of the second link information in response to the receiving of the first link information is automatic and does not require human intervention.

4. The method of claim 1, wherein (a), (b), (c) and (d) are performed by a server coupled to a network, and wherein the first link information received in (b) is received by the server from the network.

5. The method of claim 1, wherein (a), (b), (c) and (d) are performed by a first server, and wherein (c) also involves soliciting fourth link information, the method further comprising:

after (c) and before (d), including the fourth link information on a page C, page C being resident on the first server.

6. The method of claim 5, wherein page C is a dedicated links page.

7. The method of claim 5, further comprising creating page C.

8. The method of claim 5, wherein page B is resident on a second server and wherein the fourth link information is indicative of a page resident on the second server.

9. The method of claim 1, wherein (a), (b), (c) and (d) are performed by a first server, and wherein the third link information is indicative of a third page C, the third page C being resident on a second server.

10. The method of claim 9, wherein the first link information received in (b) is output after (a) by a third server, page B being resident on the third server.

11. The method of claim 1, wherein a human activates a button on page A thereby causing the first link information to be output onto a network, the first link information output onto the network being received from the network in (b).

12. The method of claim 11, wherein (a), (b), (c) and (d) are performed by a first server, and wherein software is used to activate the button.

13. The method of claim 1, wherein (d) is automatic and does not require human intervention.

14. The method of claim 1, wherein the first link information is a universal resource locator.

15. The method of claim 1, wherein (c) also includes soliciting an e-mail address.

16. The method of claim 1, wherein page A comprises
a first links page including a create page button; and wherein the second entity can create
a second links page by selecting the create page button.

17. The method of claim 16, wherein the first links page is a page of a first site and wherein the second links page is a page of a second site, a links page being a page that contains at least half of the links from the site of which the links page is a part to pages of other sites.

18. The method of claim 17, wherein the links from the site of which the links page is a part are disposed in a list.

19. The method of claim 16, wherein the first links page comprises a links field.

20. The method of claim 19, wherein the links field comprises a list of URLs.

21. The method of claim 16, wherein the first links page comprises a visual message, and wherein at least 50 percent of the visual message consists of a links field.

22. The method of claim 16, wherein (b) further comprises: 1) receiving a form after the selecting of the create page button, and 2) after the receiving of the form, supplying a password that will allow editing of the second links page.

23. The method of claim 16, wherein (b) further comprises: 1) receiving a form after the selecting of the create page button, and 2) after the receiving of the form, supplying a layout for the second links page.

24. The method of claim 16, wherein the selecting initiates an outputting of a universal resource locator onto an internet.

25. The method of claim 1, further comprising repeating (d) periodically.

26. The method of claim 1, wherein (c) also involves soliciting fourth link information and including the fourth link information on a page C.

27. A method of verifying a bidirectional link between first and second sites, the bidirectional link including first link information directing the first site to the second site and second link information directing the second site to the first site, the method comprising:

(a) outputting the first link information;

(b) determining whether the first link information corresponds to an existing resource on the second site;

(c) outputting third link information indicative of a page B of the second site that is indicated to include the second link information directing the second site to the first site; and (d) verifying that page B includes the second link information, (a) through (d) being performed automatically without human intervention.

28. The method of claim 27, wherein (a) through (d) are performed not more than once in a 24 hour period for the same first, second and third link information.

29. The method of claim 27, wherein the first link information is accessed from a server, the method further comprising:

(e) deleting the first link information from the server if the first link information is determined not to correspond to an existing resource in (b).

30. The method of claim 27, wherein the first link information is accessed from a server, the method further comprising:

(e) deleting the first link information from the server if page B does not include the second link information.

* * * * *